UNITED STATES PATENT OFFICE.

ARTHUR BENJ. BROWNE, OF CAMBRIDGE, MASSACHUSETTS, ASSIGNOR TO THE AMERICAN LEAD COMPANY, OF KITTERY, MAINE.

PROCESS OF TREATING LEAD HYDRATE PRODUCED BY ELECTROLYSIS.

SPECIFICATION forming part of Letters Patent No. 527,830, dated October 23, 1894.

Application filed January 10, 1894. Serial No. 496,411. (No specimens.)

*To all whom it may concern:*

Be it known that I, ARTHUR BENJAMIN BROWNE, of Cambridge, in the county of Middlesex and State of Massachusetts, have invented a new and useful Process of Treating Lead Hydrate Produced by Electrolysis, of which the following is a specification.

It has been found, by actual test, that, in the manufacture of white lead by electrolysis the precipitated lead hydrate is not strictly a pure white, but is slightly off color, being tinged with a yellow tint, presumably caused by the presence of aluminates in the solution, together with organic matter and other impurities. The manner in which this coloring is effected seems, from experiments made, to be as follows: When electrolysis takes place the aluminates go to the cathode, thereby coloring the alkaline hydrate brown or yellow, and when the alkaline hydrate is mixed with the lead nitrate to precipitate lead hydrate, as described in Letters-Patent No. 496,109, granted to me April 25, 1893, the aluminates are decomposed and partially precipitated with said lead hydrate, and thus give to said lead hydrate the slight tint of color; and from the well known mordanting action of aluminates it is reasonable to suppose that a similar action takes place upon the organic coloring matter which has been mechanically separated with the precipitated lead hydrate. This coloring of the product though slight is considered, by the trade as an objectionable feature.

The object of my present invention is to obviate this objection by removing the coloring matter and thus rendering a white lead produced by electrolysis absolutely white when desired and it consists in subjecting the lead hydrate, after it has been precipitated from the solution by any of the well known processes of producing white lead by electrolysis, and before it has been dried, to the action of an alkaline carbonate to discharge the coloring matter and simultaneously partially carbonate the hydrate.

It further consists in subjecting the lead hydrate, after it has been precipitated from the solution, and before being dried, to the action of an alkaline carbonate, to discharge the coloring matter and simultaneously partially carbonate the lead hydrate, separating by filtration the alkaline carbonate from the carbonated lead hydrate, washing the carbonated lead hydrate in water to remove the free alkaline carbonate and any alkaline hydrate that may have been formed during the operation, and then drying the carbonated lead hydrate.

In carrying out my invention the lead hydrate may be produced by any known electrolytic process, and when the same has been separated from the solution and before it has been dried, I subject the lead hydrate to the action of an alkaline carbonate, by placing it in a bath of said carbonate, or filtering the alkaline carbonate through the mass of lead hydrate, the result of which is that the coloring matter is absorbed by the alkaline carbonate and at the same time the lead hydrate is partially carbonated. The alkaline carbonate is then separated from the carbonated lead hydrate by filtration, and then the carbonated lead hydrate is washed in water to remove any alkaline carbonate still held in suspension therein and any alkaline hydrate that may have been formed during the operation of removing the coloring matter, and then the carbonated lead hydrate is placed in suitable shallow pans and dried by exposure to the air either heated or otherwise.

This process may be carried out in a small way by the use of simple hand apparatus or automatically by the employment of machinery not described here because it is to form the subject matter of one or more future applications for patents.

What I claim as new, and desire to secure by Letters Patent of the United States, is—

1. In the manufacture of white lead by electrolysis, the process of treating the lead hydrate which consists in subjecting the lead hydrate, after it has been precipitated from the solution and before it has been dried, to the action of an alkaline carbonate to discharge the coloring matter, and simultaneously partially carbonate the lead hydrate.

2. In the manufacture of white lead by electrolysis, the process of treating the lead hydrate which consists in subjecting the lead hydrate, after it has been precipitated from the solution and before it has been dried, to the action of an alkaline carbonate, to discharge the coloring matter, and to simultaneously partially carbonate the lead hydrate; separating the free alkaline carbonate from the carbonated lead hydrate; then washing said carbonated lead hydrate in water and then drying the same.

In testimony whereof I have signed my name to this specification, in the presence of two subscribing witnesses, on this 9th day of January, A. D. 1894.

ARTHUR BENJ. BROWNE.

Witnesses:
N. C. LOMBARD,
L. K. BLODGETT.